(12) United States Patent
Looney et al.

(10) Patent No.: US 11,180,905 B1
(45) Date of Patent: Nov. 23, 2021

(54) HYDRANT BAYONET THRUST NUT AND HYDRANT HAVING THE SAME

(71) Applicant: AVK Holding A/S, Galten (DK)

(72) Inventors: Randall K. Looney, Minden, NV (US); Lawrence R. Montee, Silver Springs, NV (US); John H. Wilber, Littleton, CO (US)

(73) Assignee: AVK HOLDING A/S, Galten (DK)

( * ) Notice: Subject to any disclaimer, the term of this patent is extended or adjusted under 35 U.S.C. 154(b) by 0 days.

(21) Appl. No.: 16/940,446

(22) Filed: Jul. 28, 2020

(51) Int. Cl.
*E03B 9/02* (2006.01)
*F16K 35/10* (2006.01)
*F16K 27/00* (2006.01)

(52) U.S. Cl.
CPC .............. *E03B 9/02* (2013.01); *F16K 27/006* (2013.01); *F16K 35/10* (2013.01); *Y10T 137/5468* (2015.04)

(58) Field of Classification Search
CPC ... E03B 9/02; E03B 9/00; E03B 9/025; E03B 9/04; E03B 9/06; E03B 9/08; E03B 9/10; E03B 9/12; E03B 2009/022; F16K 27/006; F16K 31/508; F16K 35/10; Y10T 137/5468
See application file for complete search history.

(56) References Cited

U.S. PATENT DOCUMENTS

| | | | | |
|---|---|---|---|---|
| 80,143 A * | 7/1868 | Coffin | ........................ | E03B 9/02 137/294 |
| 2,677,561 A * | 5/1954 | Mueller | .................... | E03B 9/02 384/149 |
| 4,402,531 A * | 9/1983 | Kennedy, Jr. | ........ | F16L 55/1155 285/14 |
| 4,440,190 A * | 4/1984 | Barbe | ....................... | E03B 9/02 137/272 |
| 5,630,442 A * | 5/1997 | Julicher | .................... | E03B 9/06 137/296 |
| 5,727,590 A * | 3/1998 | Julicher | .................... | E03B 9/06 137/296 |
| 2015/0330062 A1* | 11/2015 | Hoogerhyde | ....... | F16L 55/1125 137/299 |

* cited by examiner

*Primary Examiner* — Kevin F Murphy
*Assistant Examiner* — Jonathan J Waddy
(74) *Attorney, Agent, or Firm* — Cantor Colburn LLP

(57) ABSTRACT

A threadless bayonet thrust nut assembly for a hydrant, a bayonet thrust nut, and a hydrant having the same, the assembly including the bayonet thrust nut with locking features extending radially therefrom, a hydrant bonnet having retainer lugs disposed around a top opening and corresponding to the locking features, and a lock plate having downwardly extending bayonet extensions, where the locking features are configured to pass through spaces delimited by the retainer lugs when the thrust nut is maneuvered through the opening into the bonnet, where the thrust nut is rotatable between an open position in which the locking features are aligned with the spaces and a closed position in which the locking features are aligned with the retainer lugs, where the bayonet extends of the lock plate are insertable into the spaces when the thrust nut is in the closed position, and where the thrust nut in the closed position is driven against an underlying operating nut disposed with in the bonnet so as to threadlessly secure the operating nut within the hydrant.

21 Claims, 14 Drawing Sheets

HYDRANT BAYONET THRUST NUT AND HYDRANT HAVING THE SAME

TECHNICAL FIELD

This disclosure concerns hydrants and, more particularly, a hydrant bayonet nut which provides for threadless securement of an operating nut there within, and a hydrant outfitted with the same.

BACKGROUND

Dry barrel fire hydrants and post-flushing hydrants are equipped with a main valve that is located in the bottom of the hydrant below the frost line. The main valve is opened and closed by rotating an operating nut located in the top of the hydrant which, when rotated, pushes vertically on a stem rod that runs from the operating nut in the top of the hydrant to the main valve in the bottom of the hydrant. The stem rod does not rotate, but is driven vertically under pressure of the rotating operating nut and serves to engage and open/close the main valve.

Under certain conditions of water flow and pressure or, if the hydrant is closed too rapidly, the main valve may "bounce" on its seat causing a shock wave to travel up the pipe feeding water to the hydrant and potentially rupturing the pipe. This is known as a water hammer event and can damage or even destroy the respective hydrant. To control the vertical movement of the main valve and thus prevent the water hammer event, a thrust nut is traditionally installed over the operating nut. The thrust nut will assume the vertical loads imposed on the operating nut by the non-rotating stem and main valve which are subject to the water pressure of the piping system that feeds water to the hydrant.

For more than one-hundred years, fire hydrants have been designed so that the thrust nut is screwed, i.e., threaded, into the hydrant bonnet such that minor adjustments in threading the thrust nut into the hydrant bonnet will eliminate any slack vertical movement of the main valve which, if left unchecked, could cause a water hammer event. This arrangement, however, requires regular monitoring and repeated manual adjustment in order to maintain at a minimum any vertical slack in the main valve.

Another drawback common to traditional fire hydrants with a threaded-in thrust nut occurs when anti-ice road salt is splashed onto the hydrant by passing cars and trucks. The thrust nut is typically made of a copper alloy (e.g., brass or bronze) and the bonnet that the thrust nut screws into is typically made of cast gray or cast ductile iron. When the road salt gets into the iron threads of the bonnet it causes the iron of the bonnet to corrode and rust thus expanding the iron metal. The expansion of the iron increases the pressure between the iron threads of the bonnet and the threaded-in thrust nut, making it very difficult to remove the thrust nut during routine or unscheduled maintenance of the hydrant.

A further drawback of the traditional threaded-in type thrust nut is cross threading of the thrust nut threads against the threads of the bonnet. Such cross threading can permanently damage the threads of the thrust nut and/or of the bonnet rendering these components unusable and requiring their replacement at the expense of the hydrant owner. Special care must be taken when screwing in the threaded thrust nut that requires a certain degree of skill and considerable time in order to ensure proper alignment of the threads.

A fire hydrant is needed that does not require excessive time and labor to ensure against water hammer events, that can withstand the corrosive effect anti-ice road salt, and that avoids traditional threading and alignment challenges.

BRIEF SUMMARY

Provided herein is a thrust nut for a hydrant including a hexagonal upper portion, a cylindrical lower portion, a circular opening extending through the upper and lower portions, and a plurality of locking features disposed on an outer surface of the cylindrical lower portion, extending in a direction radially from a central axis of the thrust nut.

The disclosure further provides a bayonet thrust nut assembly for a hydrant including above-mentioned thrust nut, a bonnet, and a lock plate, where the bonnet is configured to releasably retain the thrust nut and the lock plate is configured to seal the bonnet when the thrust nut is said retained.

The disclosure also provides a hydrant including the above-mentioned bayonet thrust nut assembly, an upper barrel body having a top upon which the bonnet is affixed, a lower barrel body having a top affixed to a bottom of the upper barrel body and having a shoe affixed to a bottom of a lower barrel body, a main valve disposed in the shoe, an operating nut disposed in the bonnet, and a stem connected to the main valve and extending through the lower and upper barrel bodies to the operating nut, where the thrust nut is configured to threadlessly retain the operating nut within the bonnet.

BRIEF DESCRIPTION OF THE DRAWINGS

For a more complete understanding of this disclosure, reference is now made to the following brief description, taken in connection with the accompanying drawings and detailed description, wherein like reference numerals represent like parts, in which.

DETAILED DESCRIPTION

Figure 1:
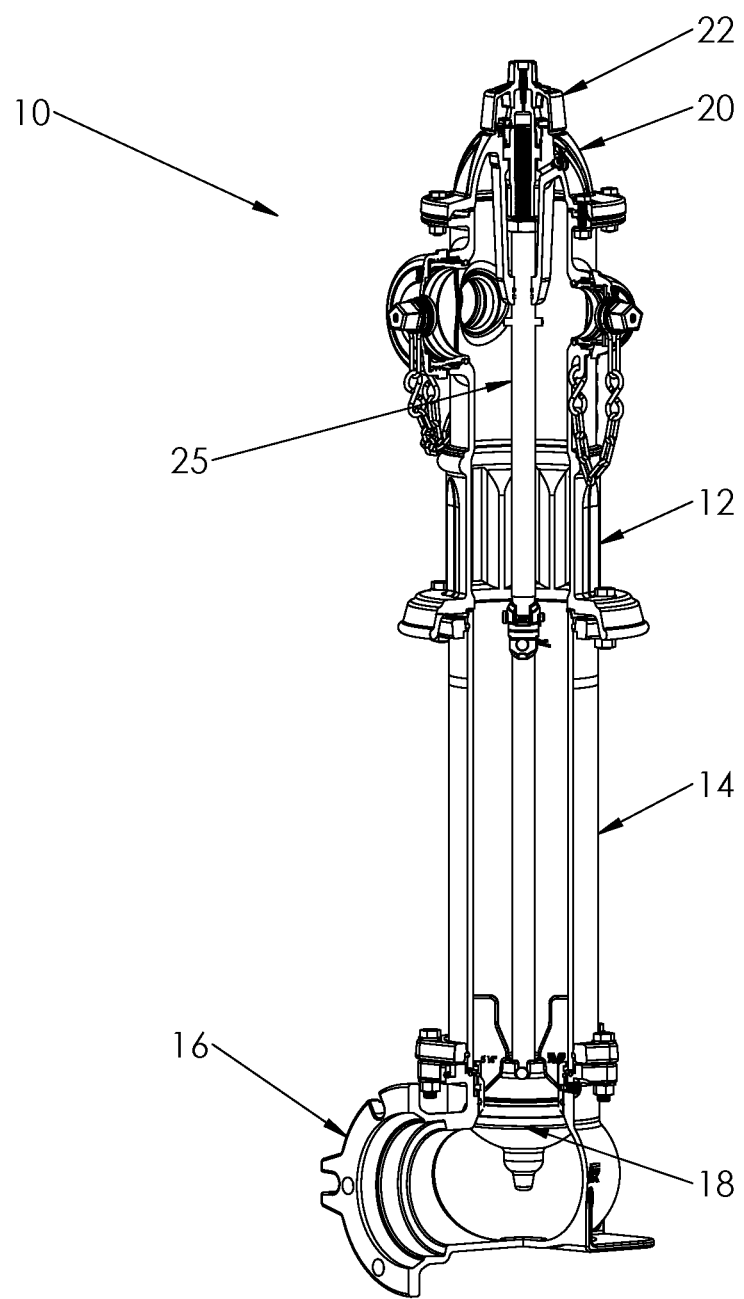
FIG. 1 is a sectional view of a fire hydrant according to one exemplary embodiment.

FIG. 1 shows a hydrant 10 in one exemplary embodiment of this disclosure. The hydrant 10 is comprised of an upper barrel 12 disposed above ground and a lower barrel 14 disposed beneath ground level. The lower barrel 14 is connected to a shoe 16 which in turn is connected to a pipe of the water supply. A main valve 18 is arranged at the interface of the lower barrel 14 and the shoe 16. The upper barrel 12 of the hydrant 10 includes a bonnet 20 disposed at an upper region of the hydrant 10. A weathershield 22 is disposed atop the bonnet 20 and is arranged over a rotatable operating nut 24. When rotated, the operating nut 24 is driven vertically against a stem 25 which extends from the operating nut 24, through the upper barrel 12, through the lower barrel 14, and to the main valve 18. The vertical action of the operating nut 24 against the stem 25 engages the main valve 18 in order to allow for the opening and closing of the valve 18, thus allowing for selective water flow through the hydrant 10. FIG. 1 shows the main valve 18 in the closed position.

The term "hydrant" is used herein generally to describe any manner of a pipe water access device including but not limited to dry barrel fire hydrants, post flushing hydrants, etc.

Figure 2:
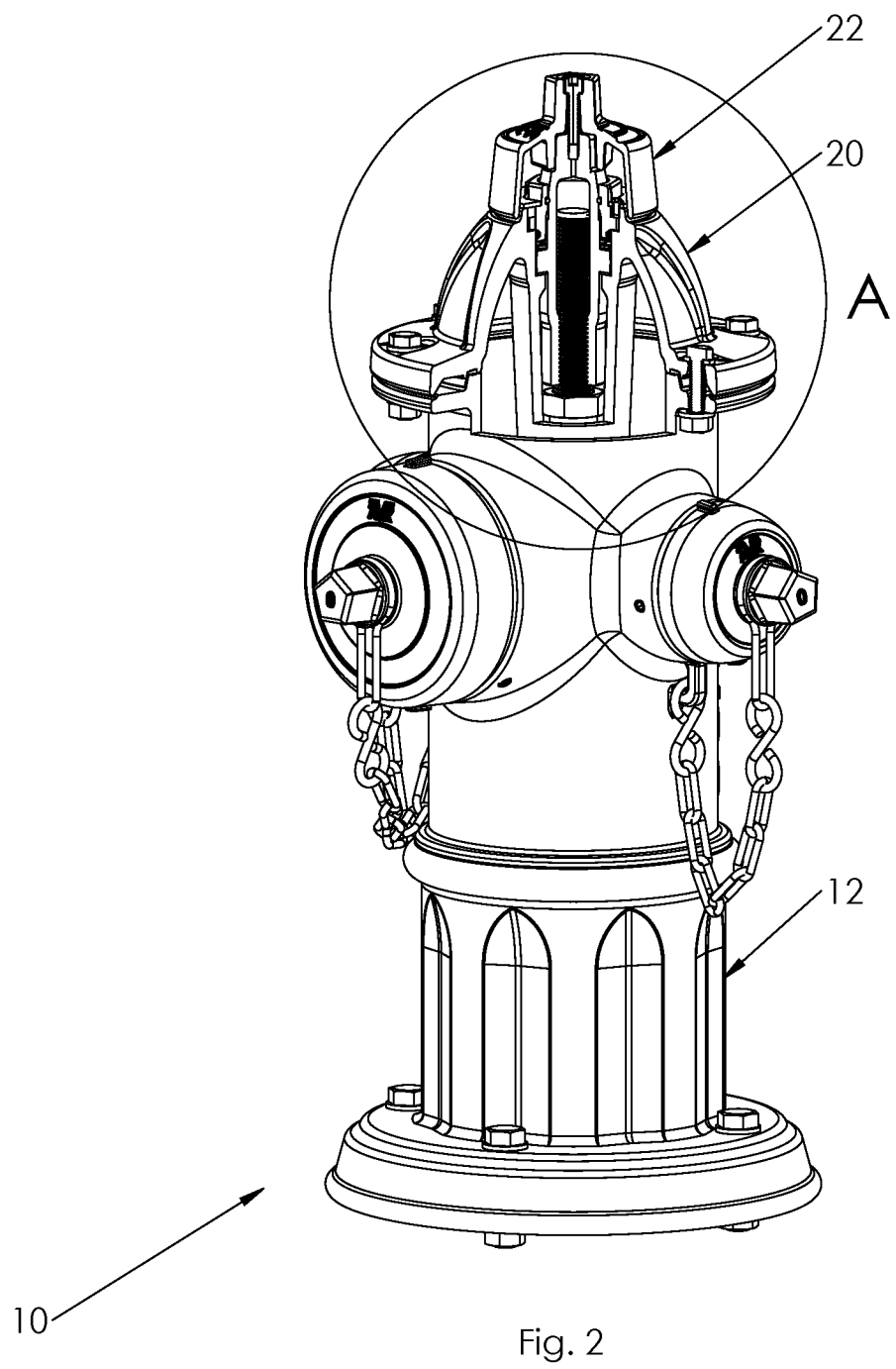
FIG. 2 is a partial sectional view of an above-ground portion thereof.
Figure 3:
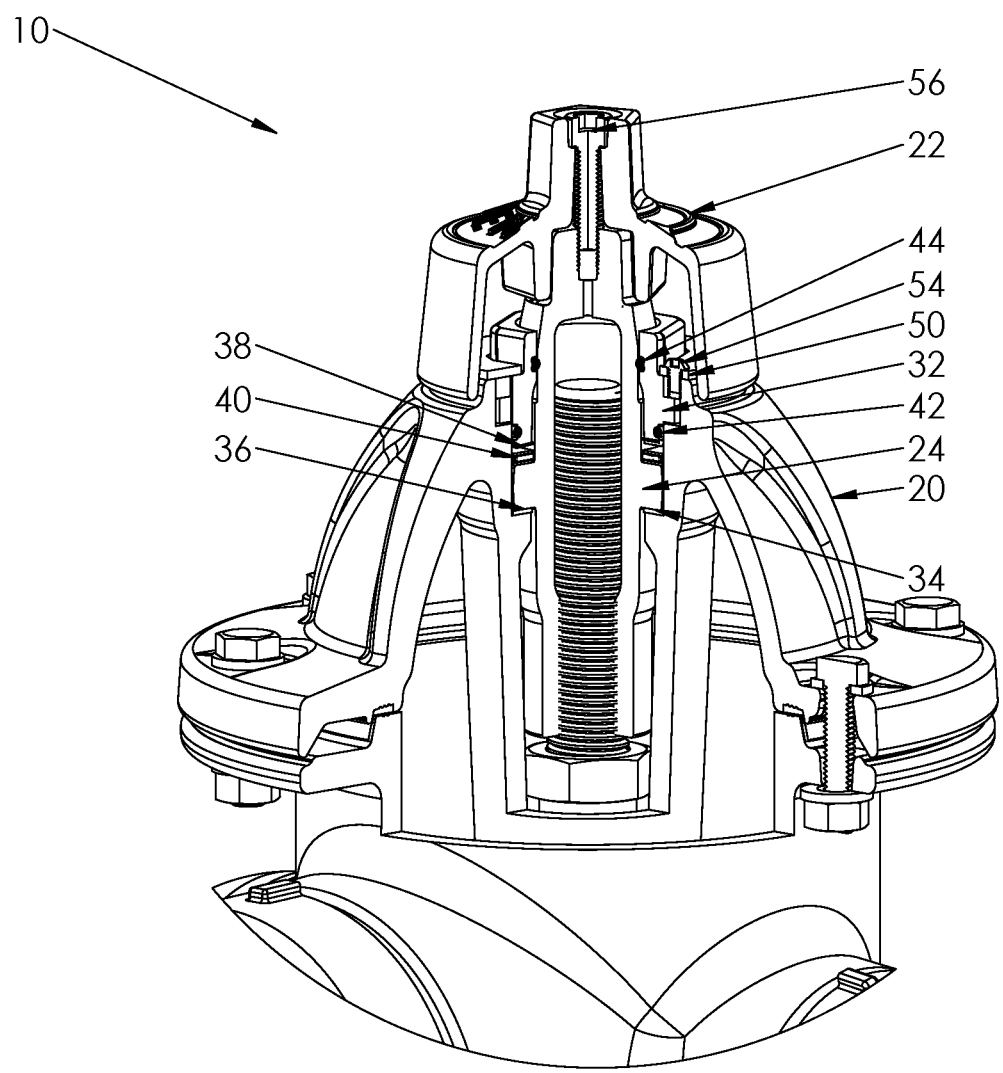
FIG. 3 is an enlarged view of the sectional portion of FIG. 2.
Figures 4, 5:
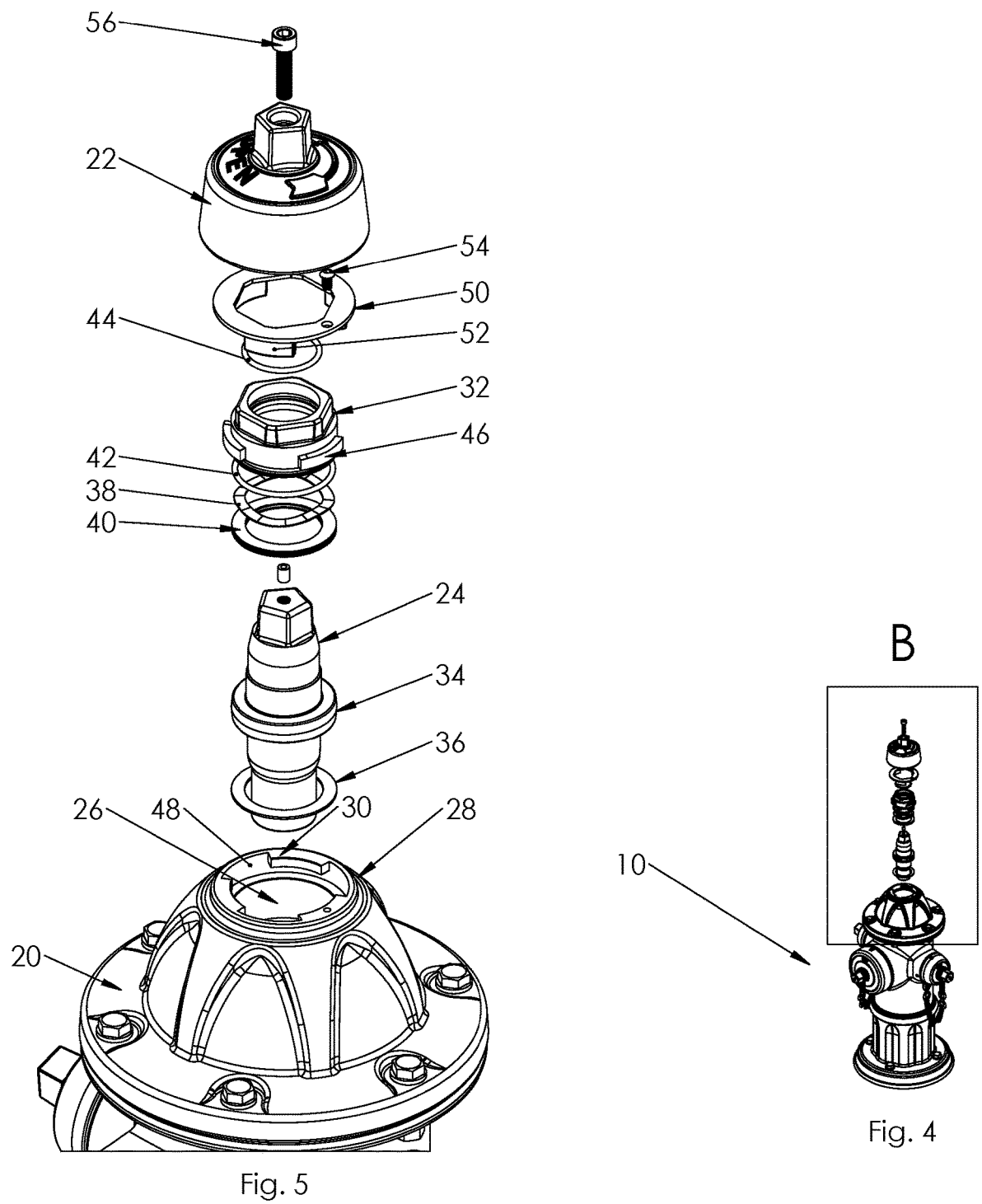
FIG. 4 is a partial exploded view of the hydrant of FIG. 2.
FIG. 5 is an enlarged view of the exploded portion of FIG. 4.

FIG. 2 shows another view of the hydrant 10 in which the lower barrel is omitted and in which an upper region A of the hydrant 10 is shown in cross section. FIG. 3 shows an enlarged view of the sectional upper region A of the hydrant 10. FIG. 4 shows a view of the hydrant 10 with a region B shown in exploded format. FIG. 5 shows an enlarged view of the exploded region B. Reference is now made to FIGS. 3-5.

The bonnet 20 includes an opening 26 at an upper end thereof which extends through an interior of the bonnet 20. The opening 26 is configured to receive the operating nut 24 and additional elements as further discussed herein. A bayonet feature 28 is disposed at the opening 26 and comprises a plurality of circumferentially extending retainer lugs 30. In the illustrated example, there are three equally spaced retainer lugs 30 each having a generally square cross-section and an overall similar shape and size. However, the number, shape, and positioning of these retainer lugs 30 can be varied under the broad scope of this disclosure. The bayonet feature 28 generally can be of any suitable configuration in order to receive and to selectively retain a bayonet thrust nut 32 as described further hereinbelow.

The operating nut 24 is arranged within the opening of the bonnet 20 and includes a cylindrical projection 34 that extends radially from an elongated body of the operating nut 24 and bears in a downward direction against a seat of the bonnet 20. An anti-friction washer 36 is disposed between the seat of the bonnet 20 and a lower surface of the cylindrical projection 34.

The bayonet thrust nut 32 is disposed upon and around the operating nut 24 within the interior of the bonnet 20 and is arranged to bear in a downward direction against the cylindrical projection 34 of the nut 24. A spring washer 38 and a thrust bearing assembly 40 are disposed on an upper surface of the cylindrical projection 34 between the projection 34 and the bayonet thrust nut 32. An outer thrust nut O-ring 42 is disposed between the thrust nut 32 and the bonnet 20 while an inner thrust nut O-ring 44 is disposed between the thrust nut 32 and the operating nut 24.

Figure 7:
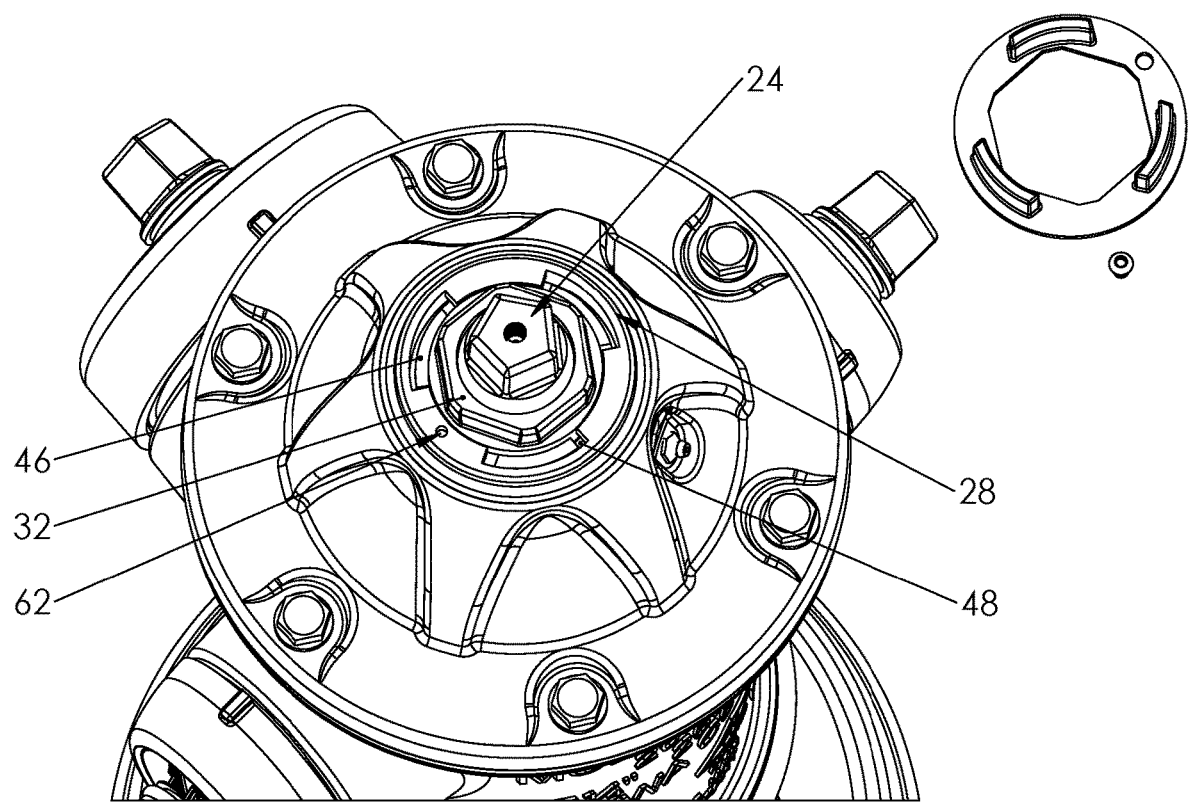
FIG. 7 is another view thereof with a lock plate removed.
Figure 8:
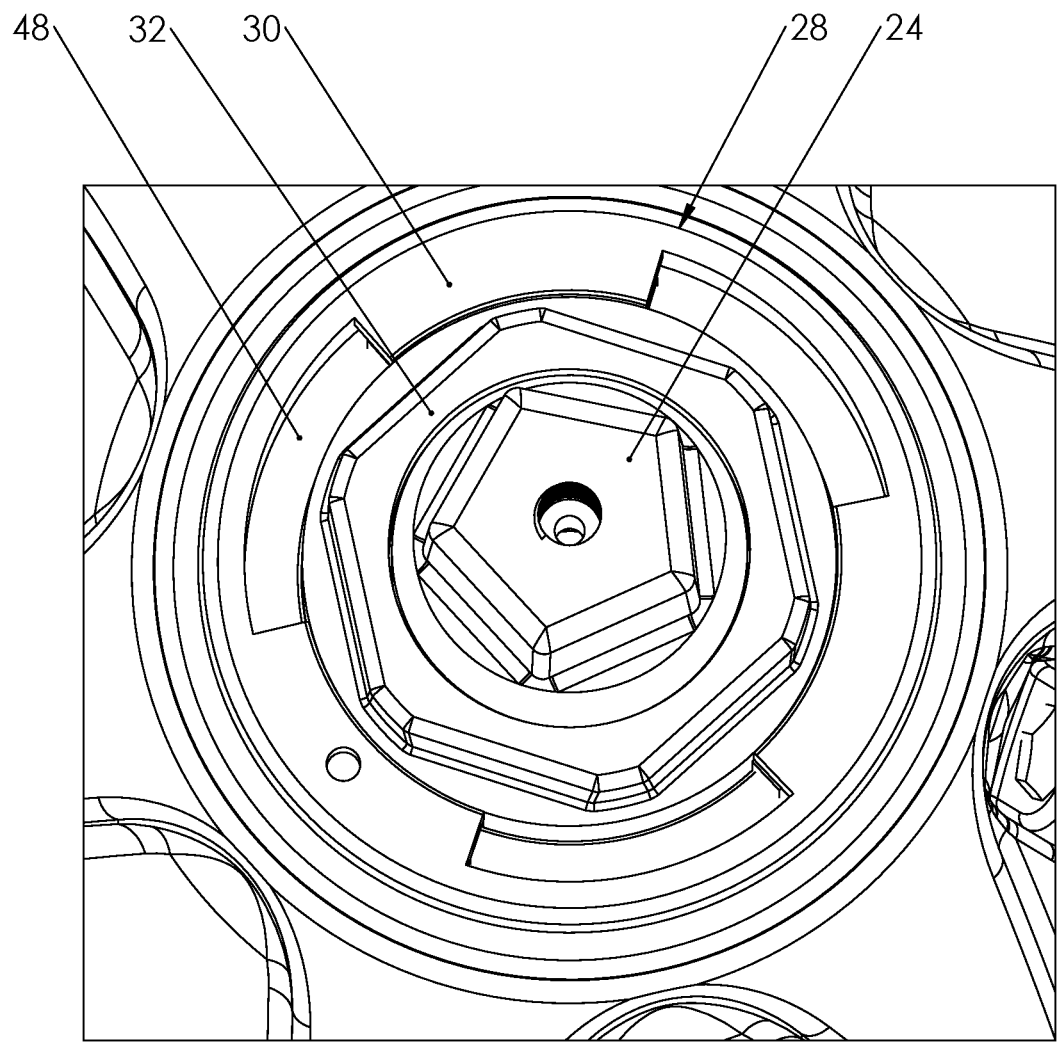
FIG. 8 is another view thereof.

The thrust nut 32 includes bayonet locking features 46 which extend from the nut 32 and which are configured and arranged to engage with the retainer lugs 30 of the bayonet 20. In the illustrated exemplary embodiment, the locking features 46 are shaped, sized, and positioned similarly to the retainer lugs 30. That is, the locking features 46 comprise three circumferentially extending members that protrude radially from the thrust nut 32, each having a generally rectilinear cross section. The retainer lugs 30 of the bayonet 20 delimit spaces 48 between each of the lugs 30. In the illustrated example, there are three spaces 48. The locking features 46 of the thrust nut 32 are sized, shaped, and positioned to pass through the spaces 48 when the thrust nut 32 is inserted within the opening 26 of the bayonet 20. FIG. 7 shows the thrust nut 32 disposed upon the operating nut 24 with the locking features 46 received within the spaces 48 of the bayonet feature 28 of the bonnet 20. As illustrated, the thrust nut 32 is in the unlocked position. FIG. 8 shows the thrust nut 32 in the locked position. Here, the thrust nut 32 has been rotated relative to the bayonet feature 28 of the bonnet 20 such that the locking features 46 of the thrust nut 32 are positioned beneath the retainer lugs 30.

Figure 6:
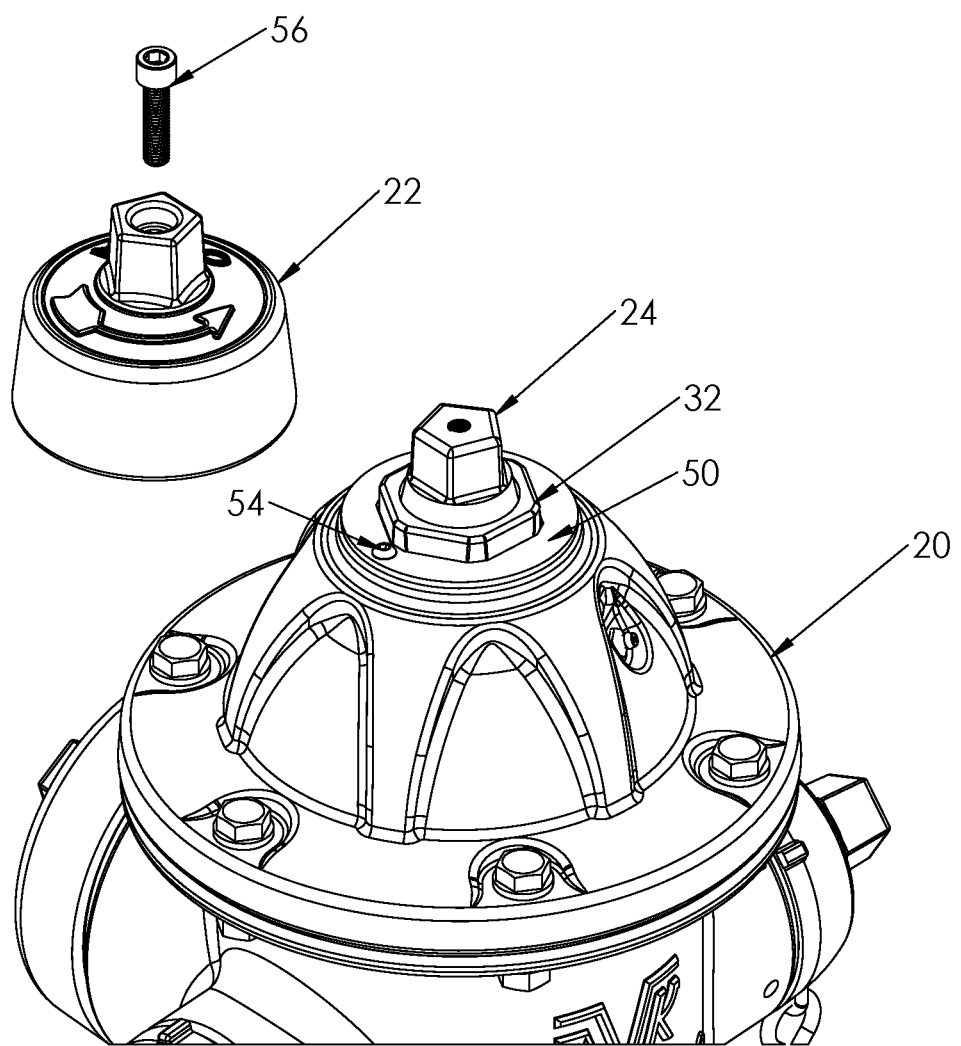
FIG. 6 shows a fire hydrant bonnet arrangement according to one exemplary embodiment.
Figure 9:
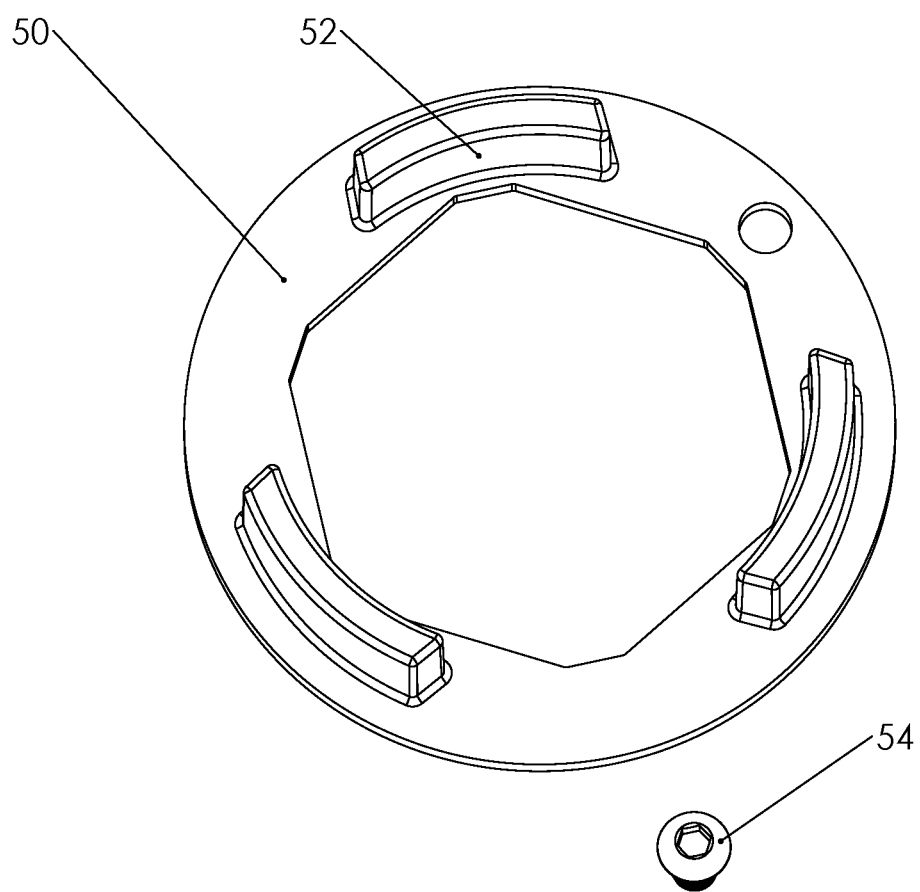
FIG. 9 shows the lock plate.
Figure 10:
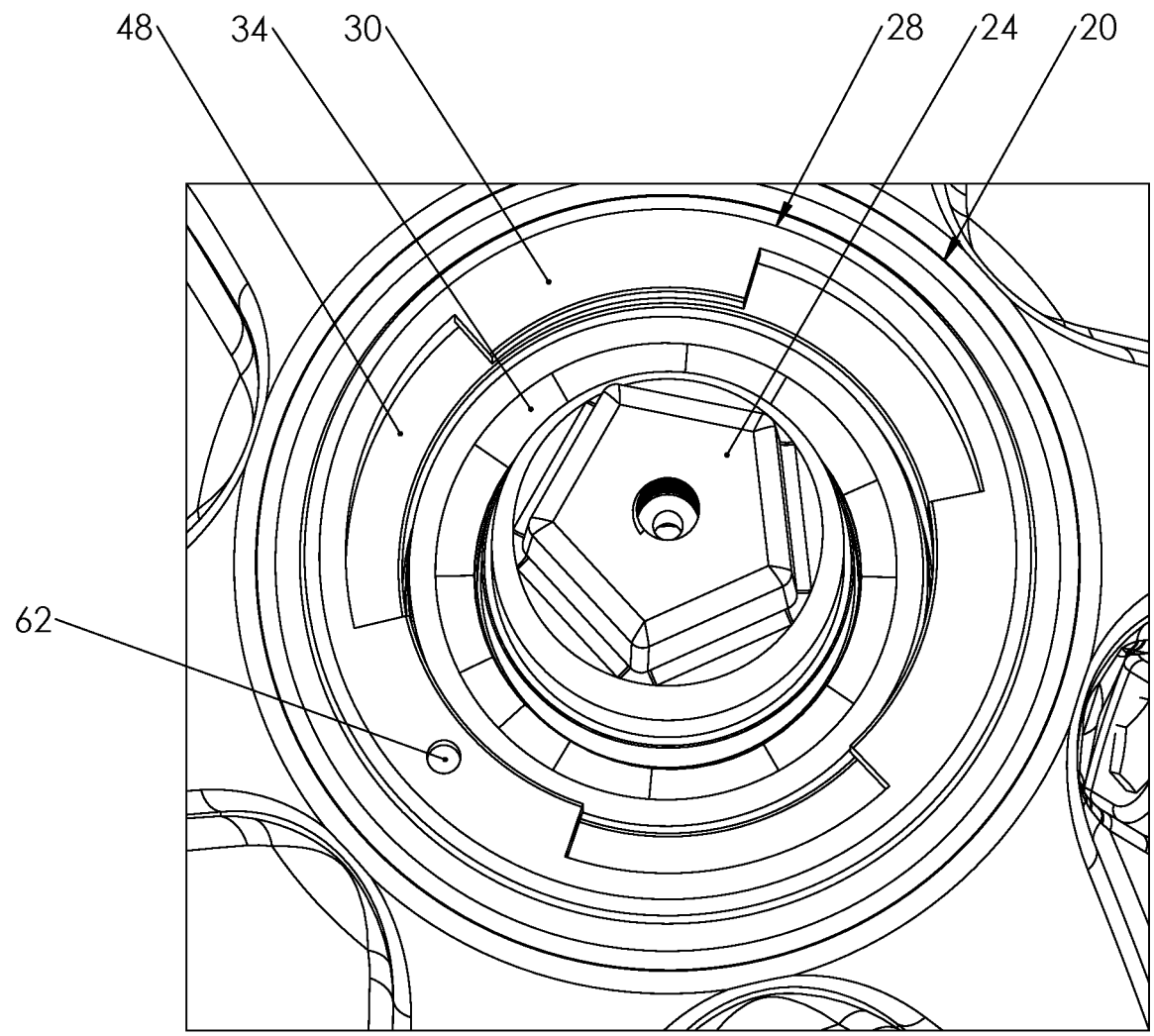
FIG. 10 is another view thereof with a thrust nut removed.

Reverting to FIGS. 2-5, a bayonet lock plate 50 is disposed on top of the thrust nut 32. The lock plate 50 is essentially an annular member having bayonet extensions 52 which traverse in a circumferential manner and also extend downwardly relative to the annular member. In the illustrated example, the lock plate 50 includes three bayonet extensions 52 which are shaped, sized, and positioned to be received within the spaces 48 of the bonnet bayonet feature 28 when the thrust nut 32 is moved into the locked position. FIG. 6 shows the lock plate 50 disposed upon the bonnet 20 in this position. The lock plate 50 is held in place by a screw 54. See also, FIG. 9, which provides an enlarged view of the lock plate 50 and the screw 54.

When inserted in the bonnet 20 and secured thereto as illustrated in the drawings, the lock plate 50 prevents inadvertent rotation of the thrust nut 32. The lock plate 50 further serves a secondary purpose in that it helps to prevent debris from getting into recesses between the rotated locking features 46 of the thrust nut 32 and the retainer lugs 30 of the bonnet bayonet feature 28. Any significant accumulation of debris inside this area of the thrust nut arrangement may cause the bayonet thrust nut 32 to be difficult to remove for maintenance. The lock plate 50 advantageously prevents such accumulation. The lock plate 50 may be made of any material sufficient for preventing inadvertent rotation of the thrust nut 32 and for prevent entry of unwanted debris. For example, the lock plate 50 may be formed of at least one of a metal or a plastic or a composite material, etc. Where the lock plate 50 is plastic, it may be treated so as to be inhibited against the deteriorating effects of ozone and sunlight.

Returning again to FIGS. 2-5, a weathershield bolt 56 extends through the weathershield 22 and engages with the operating nut 24 to secure the weathershield 22 on the bonnet 20.

Figure 11:
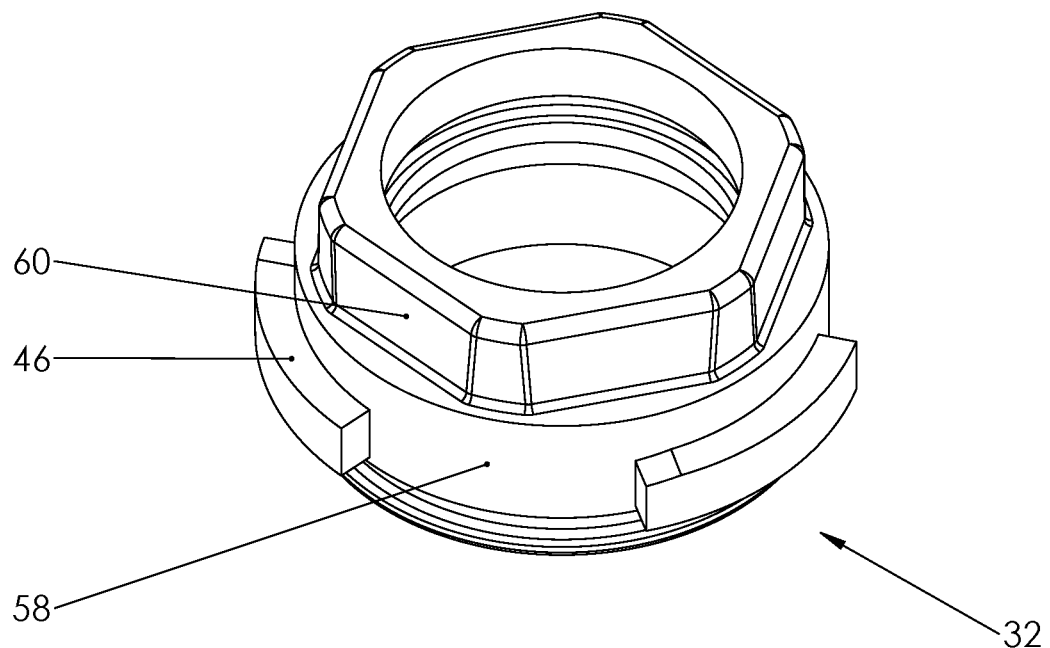
FIG. 11 shows the thrust nut.

FIG. 11 shows an enlarged view of the bayonet thrust nut 32. The thrust nut 32 is generally an annular shaped member having a lower cylindrical portion 58 and an upper hexagon portion 60. The bayonet locking features 46 extend radially from and traverse circumferentially around the lower cylindrical portion 58. The upper hexagon portion 60 is intended to be grasped, for example by a wrench, to enable rotation of the thrust nut 32 between the open and closed positions, as discussed hereinabove. The upper portion 60 of the thrust nut 32 may of course assume any other shape sufficient for allowing the grasping and rotating thereof, for example, octagonal, pentagonal, rectangular, etc. As noted previously, the illustration of three elongated locking features 46 having generally rectilinear cross sections is exemplary. The thrust nut 32 may include fewer or more locking features 46 and said features 46 may assume any shape, size, and positioning sufficient for engaging and selectively mating with the retainer lugs 30 of the bonnet 20. For example, the thrust nut 32 may include two protruding locking features 46 or four locking features 46, etc., and the locking features may be shorter or longer in circumferential length and/or may be shorter or longer in radial projection and/or may have circular or curvilinear cross sections and/or the cross sections may be consistent or vary across the several locking features 46.

Figure 12:
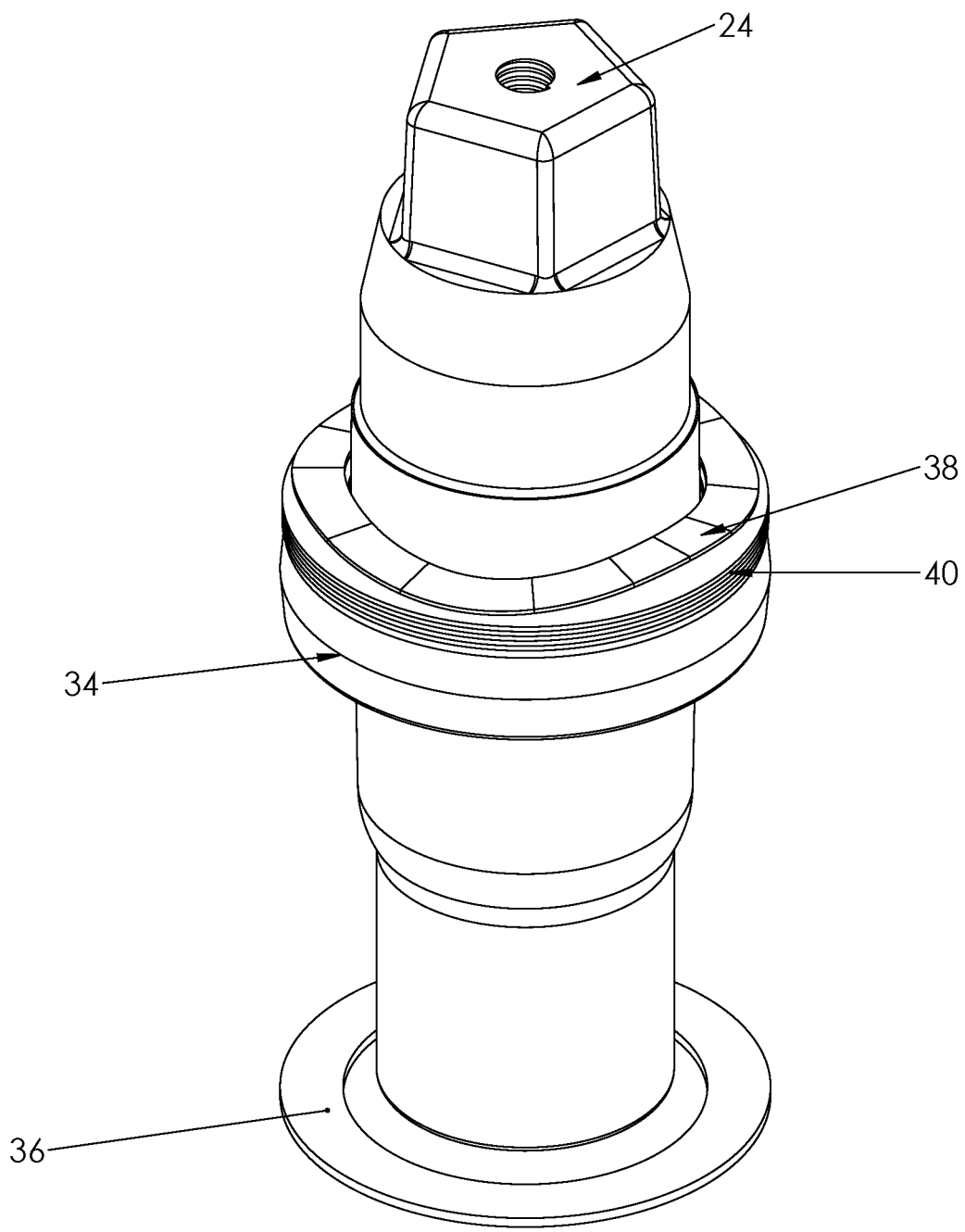
FIG. 12 shows an operating nut.
Figure 14:
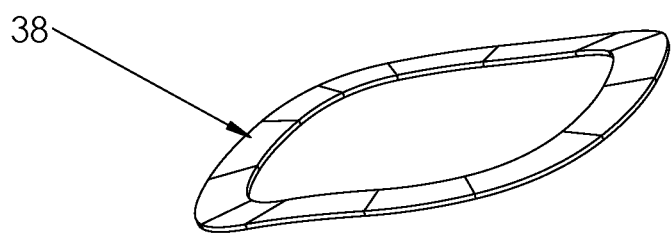
FIG. 14 shows a spring washer.

FIG. 12 shows an enlarged view of the operating nut 24 and the associated spring washer 38, the thrust bearing assembly 40, and the anti-friction washer 36. The thrust bearing assembly 40 is configured to allow rotation of the bayonet thrust nut 32 when disposed thereupon. The spring washer 38 is compressed by the thrust nut 32 when the thrust nut 32 is rotated into the locked position. The spring washer 38 (shown also in FIG. 14), in this compressed state, restricts vertical movement of the operating nut 24 which helps reduce the occurrence of water hammer events. That is, the spring washer 38 eliminates slack vertical movement of the main valve 18 which could otherwise be subject to a shock wave during closing of the main valve 18 or under certain water pressure conditions, which could then lead to an undesired water hammer event. The disclosed arrangement reduces or negates such vertical slack movement and thus avoids water hammer.

Figure 13:
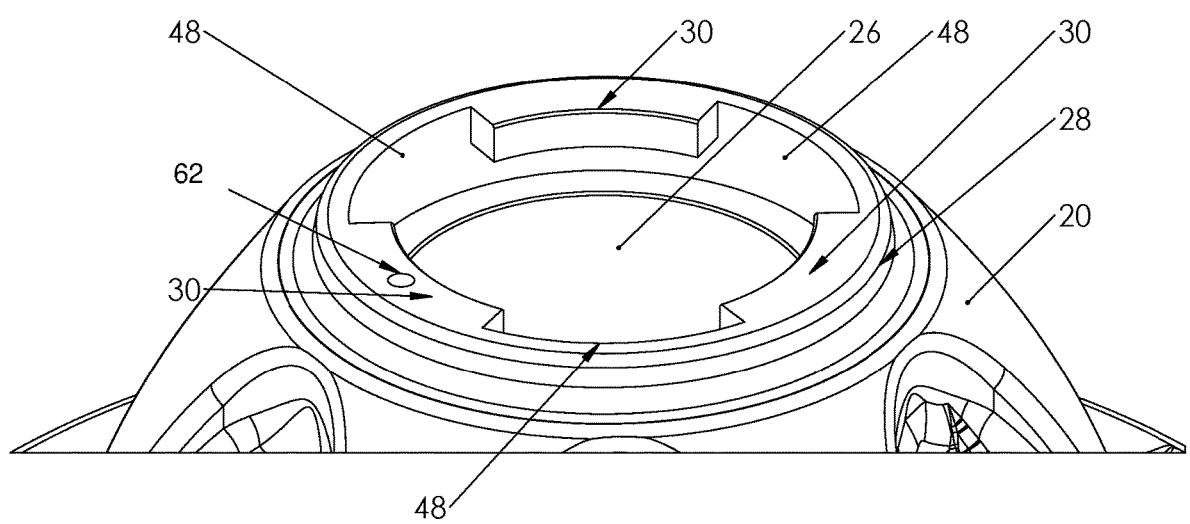
FIG. 13 is enlarged partial view of a top of the bonnet.

FIG. 13 shows an enlarged view of the bayonet feature 28 of the bonnet 20. Three retainer lugs 30 are illustrated as delimiting three corresponding spaces 48 which are configured to receive the protruding bayonet locking features 46 of the thrust nut 32. As noted previously, the number, size, shape, and placement of the retainer lugs 30 may vary within the broad scope of the disclosure. Essentially, the retainer lugs 30 are non-thread based protrusions, past which the corresponding locking features 46 of the thrust nut 32 are maneuvered and brought into underlying engagement with, in order to secure the thrust nut 32 to the bonnet 20 and to secure the operating nut 24 therewithin. A screw hole 62 is formed on the bayonet feature 28 of the bonnet 20 and is configured to receive the screw 54 of the lock plate 50 in order to secure the lock plate 50 upon the bonnet 20. In the illustrated example, the screw hole 62 is formed in one of the retainer lugs 30. In another embodiment, the screw hole may be formed elsewhere on the bayonet feature 28 or elsewhere on the bonnet 20. The screw 54 is but one example within this broad disclosure of how the lock plate 50 is affixed to the bonnet 20. Other mechanisms and arrangements may be used in order to secure the lock plate 50 to the bonnet 20.

Figure 15:
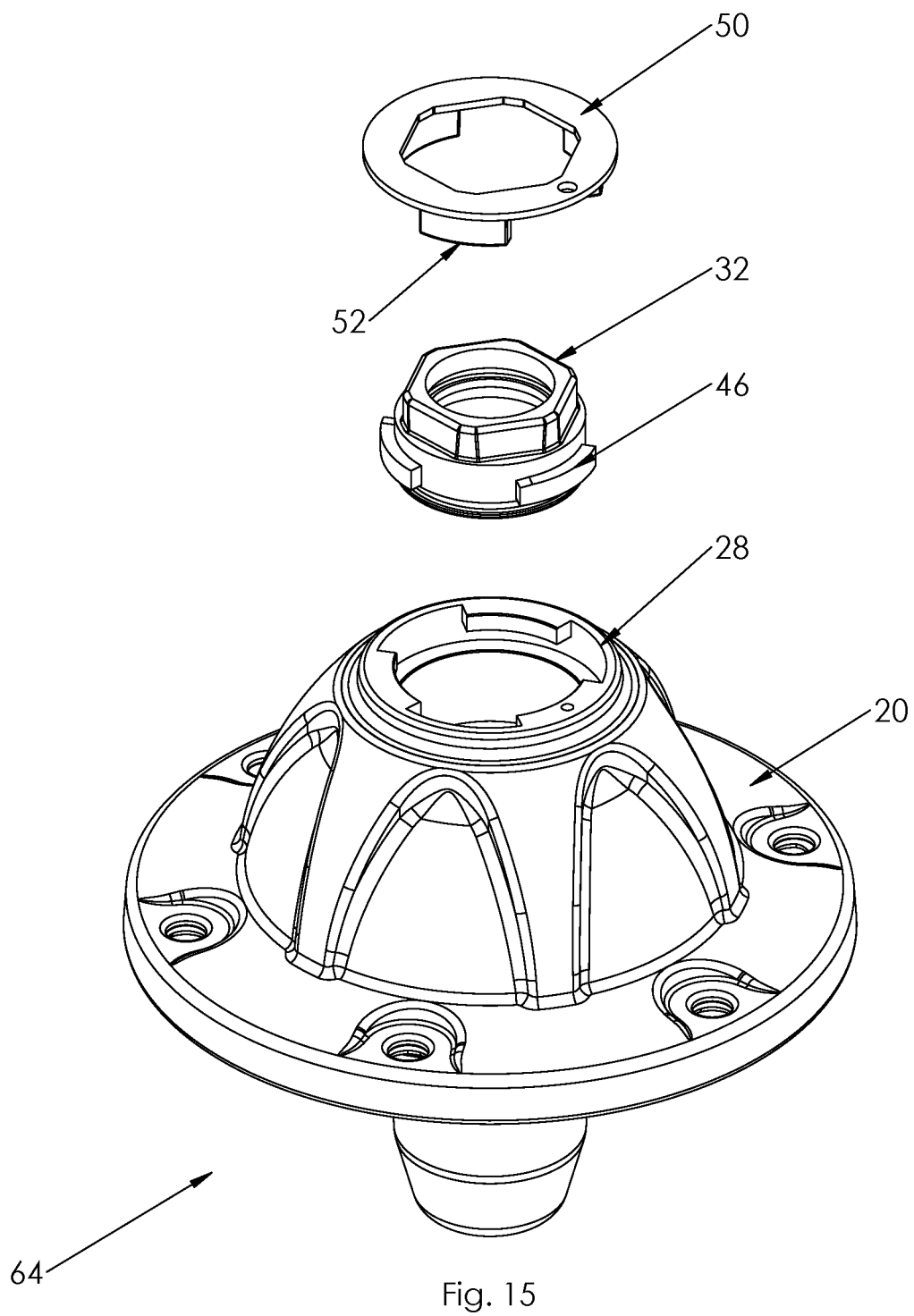
FIG. 15 shows a bayonet thrust nut fire hydrant assembly.

FIG. 15 shows a bayonet thrust nut hydrant assembly 64 comprising the bonnet 20 with the bayonet feature 28, the bayonet thrust nut 32 with the bayonet locking features 46, and the bayonet lock plate 50 with the bayonet extensions 52. This assembly 64 ensures that the operating nut 24 is secured within the bonnet 20 without requiring traditional threading and without the disadvantages associated. Namely, the interaction of the thrust nut 32 and the operating nut 24 with the spring washer 38 disposed therebetween eliminates vertical slack movement common in traditional thread-based thrust nut arrangements, thus minimizing the occurrence of water hammer events. Further, the bayonet arrangement of the present disclosure is not subject to the deleterious corrosive effects of anti-ice road salt as in traditional thread-based thrust nut arrangements in which threads exposed to such materials can expand and unintentionally clamp in place the respective bonnet and thrust nut. The assembly 64 does not include such threads and instead provides prominent bayonet features which are not subject to the expansion and clamping seen in traditional thread-based thrust nut arrangements. Additionally, damage by cross threading, common in threaded thrust nut arrangements, is wholly avoided by the novel threadless bayonet mating structures disclosed herein. Moreover, time and labor intensive threading of a thrust nut to a bonnet is eliminated by the present arrangement which allows for rapid and simple installation of the thrust nut 32 in the bonnet 20.

The bayonet hydrant assembly 64 may include a sealing system by which water (e.g., storm water, water splashed up by vehicles, etc.) is kept out of a lubrication chamber of the hydrant. The assembly may additionally and/or alternatively include a sealing system configured to keep the internal hydrant lubricant from leaking out of the hydrant.

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. Terms such as "connected to", "affixed to", etc., can include both an indirect "connection" and a direct "connection."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A bayonet thrust nut assembly for a hydrant, comprising:
   a thrust nut;
   a bonnet; and
   a lock plate;
   wherein the bonnet is configured to releasably retain the thrust nut and the lock plate is configured to seal the bonnet when the thrust nut is said retained;
   wherein the thrust nut comprises:
      an upper portion shaped to allow grasping thereof during installation and removal;
      a cylindrical lower portion;
      a circular opening extending through the upper and lower portions; and
      a plurality of locking features disposed on an outer surface of the cylindrical lower portion, extending in a direction radially from a central axis of the thrust nut;
   wherein the bonnet includes an opening formed at a top of the bonnet and extending centrally through the bonnet, a plurality of retainer lugs formed at the top of the bonnet and disposed around the opening of the bonnet, and a plurality of spaces delimited by and between the retainer lugs wherein the plurality of locking features of the thrust nut are configured to pass through the spaces at the top of the bonnet when the thrust nut is maneuvered into the opening of the bonnet.

2. The bayonet thrust nut assembly according to claim 1, wherein the locking features extend along respective portions of a circumference of the outer surface of the cylindrical lower portion.

3. The bayonet thrust nut assembly according to claim 1, wherein the plurality of locking features comprises three locking features equally spaced around the outer surface of the cylindrical lower portion.

4. The bayonet thrust nut assembly according to claim 1, wherein the plurality of locking features each have a rectilinear cross-section.

5. The bayonet thrust nut assembly according to claim 1, wherein the plurality of locking features are configured to engage with corresponding retainer lugs of the bonnet of the hydrant such that the thrust nut can be removably affixed to the bonnet.

6. The bayonet thrust nut assembly of claim 1, wherein the thrust nut is rotatable within the opening of the bonnet beneath a plane of the retainer lugs from an open position in which each of the locking features is aligned with one of the spaces and a closed position in which each of the locking features is aligned with one of the retainer lugs.

7. The bayonet thrust nut assembly of claim 6, wherein the lock plate is an annular member including a plurality of downwardly extending bayonet extensions configured to be received within the spaces when the thrust nut is in the closed position.

8. The bayonet thrust nut assembly of claim 1, wherein the plurality of locking features of the thrust nut comprises three locking features equally spaced around the outer surface of the cylindrical lower portion of the thrust nut, and wherein the plurality of retainer lugs comprises three retainer lugs equally spaced around a perimeter of the opening of the bonnet at the top of the bonnet and extending in a radial direction into the opening of the bonnet, wherein the three locking features are configured to pass through the spaces between the retainer lugs when the thrust nut is maneuvered into the opening of the bonnet and the thrust nut is rotatable within the opening of the bonnet beneath the retainer lugs between an open position in which the three locking features are aligned with the spaces and a closed position in which the three locking features are aligned with the three retainer lugs.

9. A hydrant, comprising:
the bayonet thrust nut assembly of claim 1;
an upper barrel body having a top upon which the bonnet is affixed;
a lower barrel body having a top affixed to a bottom of the upper barrel body and having a shoe affixed to a bottom of the lower barrel body;
a main valve disposed in the shoe;
an operating nut disposed in the bonnet; and
a stem connected to the main valve and extending through the lower and upper barrel bodies to the operating nut;
wherein the thrust nut is configured to threadlessly retain the operating nut within the bonnet.

10. The hydrant of claim 9, wherein the operating nut comprises an elongated body and a radially extending cylindrical portion having an upper surface and a lower surface, the cylindrical portion extending from the elongated body at a mid-region of the operating nut.

11. The hydrant of claim 10, wherein the operating nut is disposed at an interior of the bonnet within the opening of the bonnet.

12. The hydrant of claim 11, wherein the plurality of locking features of the thrust nut are configured to pass through the spaces at the top of the bonnet when the thrust nut is maneuvered into the opening of the bonnet, and wherein the thrust nut is rotatable within the opening of the bonnet beneath a plane of the retainer lugs from an open position in which each of the locking features is aligned with one of the spaces and a closed position in which each of the locking features is aligned with one of the retainer lugs.

13. The hydrant of claim 12, wherein the lower surface of the cylindrical portion of the operating nut bears upon a seat of the bonnet formed at the interior thereof, and wherein the upper surface of the cylindrical portion of the operating nut engages a bottom of the cylindrical lower portion of the thrust nut when the thrust nut is in the open and closed positions.

14. The hydrant of claim 13, further comprising:
a spring washer and a bearing assembly disposed between the upper surface of the cylindrical portion of the operating nut and the bottom of the cylindrical lower portion of the thrust nut; and
an anti-friction washer disposed between the lower surface of the cylindrical portion of the operating nut and the seat of the bonnet;
wherein the bearing assembly allows relative rotation between the thrust nut and the operating nut;
wherein the anti-friction washer allows rotation of the operating nut relative to the bonnet; and
wherein the spring washer is compressed when the thrust nut is placed into the closed position and restricts vertical movement of the operating nut.

15. The hydrant of claim 13, further comprising the lock plate having a plurality of downwardly extending bayonet extensions configured to be received within the spaces when the thrust nut is in the closed position.

16. The hydrant of claim 9, further comprising a sealing system configured to prevent external water from entering the hydrant.

17. The hydrant of claim 9, further comprising a sealing system configured to prevent internal hydrant lubricant from exiting the hydrant.

18. A bayonet thrust nut assembly for a hydrant, comprising:
a thrust nut;
a bonnet; and
a lock plate;
wherein the bonnet is configured to releasably retain the thrust nut and the lock plate is configured to seal the bonnet when the thrust nut is said retained;
wherein the thrust nut comprises:
an upper portion shaped to allow grasping thereof during installation and removal;
a cylindrical lower portion;
a circular opening extending through the upper and lower portions; and
a plurality of locking features disposed on an outer surface of the cylindrical lower portion, extending in a direction radially from a central axis of the thrust nut;
wherein the bonnet includes an opening formed at a top of the bonnet and extending centrally through the bonnet, a plurality of retainer lugs formed at the top of the bonnet and disposed around the opening of the bonnet, and a plurality of spaces delimited by and between the retainer lugs wherein the plurality of locking features of the thrust nut comprises three locking features equally spaced around the outer surface of the cylindrical lower portion of the thrust nut, and wherein the plurality of retainer lugs comprises three retainer lugs equally spaced around a perimeter of the opening at the top of the bonnet and extending in a radial direction into the opening of the bonnet, wherein the three locking features are configured to pass through the spaces between the retainer lugs when the thrust nut is maneuvered into the opening of the bonnet and the thrust nut is rotatable within the opening of the bonnet beneath the retainer lugs between an open position in which the three locking features are aligned with the spaces and a closed position in which the three locking features are aligned with the three retainer lugs.

19. The bayonet thrust nut assembly according to claim 18, wherein the locking features extend along respective portions of a circumference of the outer surface of the cylindrical lower portion.

20. The bayonet thrust nut assembly according to claim 18, wherein the plurality of locking features each have a generally rectilinear cross-section.

21. The bayonet thrust nut assembly according to claim 18, wherein the plurality of locking features are configured to engage with corresponding retainer lugs of the bonnet of the hydrant such that the thrust nut can be removably affixed to the bonnet.

\* \* \* \* \*